United States Patent [19]

Kawai et al.

[11] Patent Number: 5,451,761
[45] Date of Patent: Sep. 19, 1995

[54] BAR CODE DEMODULATING METHOD

[75] Inventors: Hiroaki Kawai; Shinichi Sato, both of Kawasaki, Japan

[73] Assignee: Fujitsu Limited, Kawasaki, Japan

[21] Appl. No.: 91,022

[22] Filed: Jul. 14, 1993

[30] Foreign Application Priority Data

Jul. 14, 1992 [JP] Japan .................. 4-186813

[51] Int. Cl.⁶ ............................. G06K 7/10
[52] U.S. Cl. .................................. 235/463
[58] Field of Search .......................... 235/463

[56] References Cited

U.S. PATENT DOCUMENTS

| | | | |
|---|---|---|---|
| 4,354,101 | 10/1982 | Hester et al. | 235/463 |
| 4,414,468 | 11/1983 | Laurer et al. | 235/463 |
| 4,528,443 | 7/1985 | Smith | 235/463 |
| 4,757,206 | 7/1988 | Ohta | 235/463 |

Primary Examiner—John Shepperd
Attorney, Agent, or Firm—Staas & Halsey

[57] ABSTRACT

A bar code demodulating method includes a step of measuring lengths of successive characters of a bar code, a step of obtaining a ratio of the length of a demodulating character which is to be demodulated and the length of a previous character which is demodulated prior to the demodulating character, and a step of demodulating the demodulating character by correcting a width of at least one reference bar within the previous character based on the ratio and by obtaining a number of modules within the demodulating character based on the correction.

7 Claims, 11 Drawing Sheets

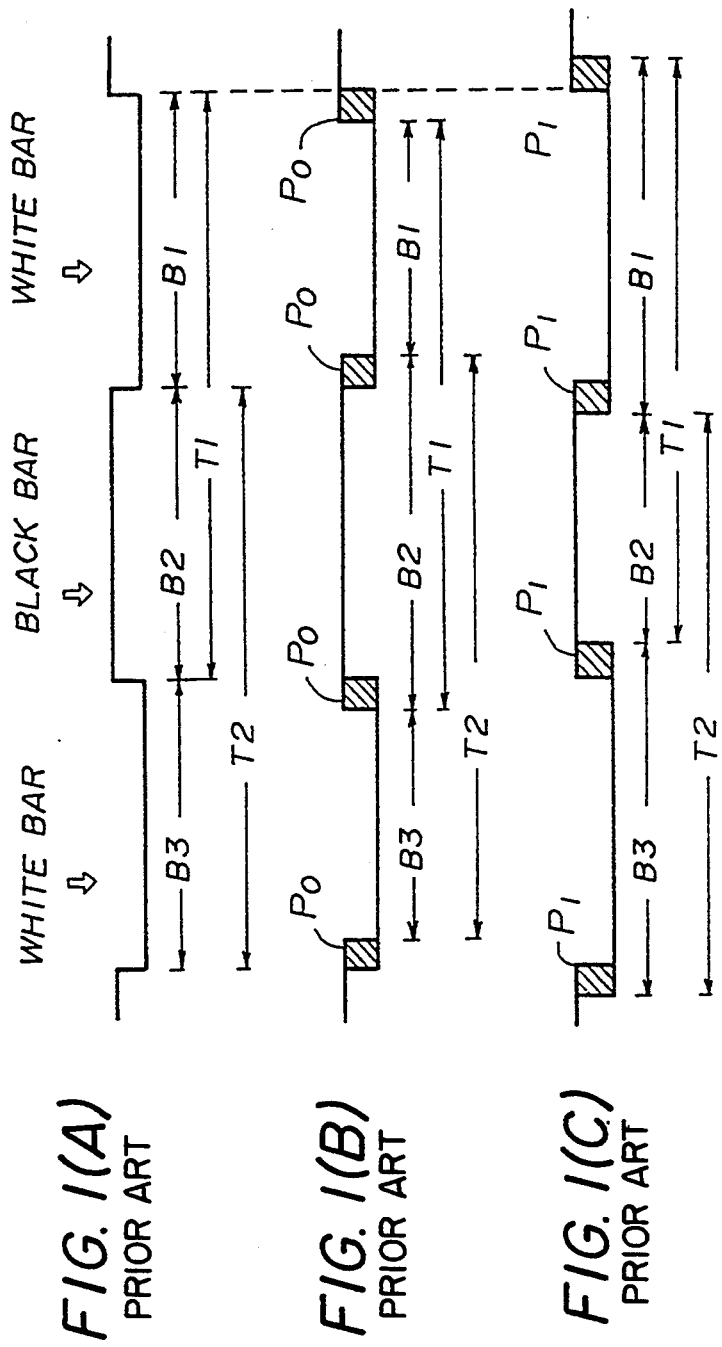

|  | NO. OF MODULES OF T2 | | | |
|---|---|---|---|---|
|  | 2 | 3 | 4 | 5 |
| 2 | E6 | 00 | E4 | 06 |
| 3 | 09 | E2 | 01 | E5 |
|   |    | E8 | 07 |    |
| 4 | E9 | 02 | E1 | 05 |
|   |    | 08 | E7 |    |
| 5 | 06 | E0 | 04 | E3 |

NO. OF MODULES OF T1

BAR CODE DEMODULATING METHOD

BACKGROUND OF THE INVENTION

The present invention generally relates to bar code demodulating methods and, more particularly, to a bar code demodulating method which can accurately read a bar code even if the printing quality of the bar code is poor, if the widths of the bars are non-uniform due to curved labels, or the like.

The use of bar codes is becoming very popular, as typified by the use of bar codes at point-of-sale (POS) terminals of circulation systems. On the other hand, there is an increasing number of bar codes having a poor printing quality, and there are demands to correctly read the bar codes regardless of their printing quality.

For example, the poor printing quality introduces the defect that the black bar of the bar code may increase or decrease in width. FIG. 1 (A) shows the respective widths of white and black bars of the bar code when the bars are correctly printed. FIG. 1 (B) shows a case where the width of the black bar is increased by a part $P_0$ due to the poor printing quality, and FIG. 1 (C) shows a case where the width of the black bar is decreased by a part $P_1$ due to the poor printing quality.

A length T1 of two successive parts B1 and B2, that is, the white level part B1 and the black level part B2 in FIG. 1 (B), is equal to the length T1 of the two successive white and black level parts B1 and B2 in FIG. 1 (A). Similarly, a length T2 of two successive parts B2 and B3, that is, the black level part B2 and the white level part B3 in FIG. 1 (B), is equal to the length T2 of the two successive black and white level parts B2 and B3 in FIG. 1 (A). Furthermore, lengths T1 and T2 shown in FIG. 1 (C) are respectively equal to the lengths T1 and T2 shown in FIG. 1 (A). These lengths T1 and T2 are sometimes referred to as δ-distances. By use of these δ-distances T1 and T2, it is possible to eliminate the undesirable effects of uniformly increased and decreased widths of the black bars. For this reason, the δ-distances T1 and T2 are used when demodulating the read bar code.

When discriminating the bar code using the δ-distances T1 and T2, an odd zero 00 has module numbers T1=2 and T2=3, and an even zero E0 has module numbers T1=5 and T2=3, as shown in FIG. 2. Hence, the numerical value indicated by the bar code is discriminated, depending on the module numbers of the δ-distances T1 and T2.

In FIG. 2, the left column shows the odd zero 00 through an odd nine 09, the right column shows the even zero E0 through an even nine E9, each blank square indicates a module corresponding to a white bar and each square with hatching indicates a module corresponding to a black bar. The odd zero 00 through odd nine 09 correspond to cases where an odd number of modules, corresponding to the black bars, exist within one character length, and the even zero E0 through even nine E9 correspond to cases where an even number of modules, corresponding to the black bars, exist within one character length. In the case shown in FIG. 2, one character length includes seven modules.

The numerical value of the read bar code is discriminated, by using a demodulation table shown in FIG. 3, depending on the module numbers of the δ-distances T1 and T2.

As may be seen from FIGS. 2 and 3, when the numerical value of the bar code is discriminated by the module numbers of the δ-distances T1 and T2, the odd one 01 and the odd seven 07 cannot be distinguished from each other because T1=3 and T2=4, that is, the δ-distances T1 and T2 are the same for both 01 and 07. Similarly, the even two E2 and the even eight E8 cannot be distinguished from each other because T1=3 and T2=3, that is, the δ-distances T1 and T2 are the same for both E2 and E8. For similar reasons, the odd two 02 and the odd eight 08 cannot be distinguished from each other, and the even one E1 and the even seven E7 cannot be distinguished from each other.

Accordingly, it is necessary to distinguish the above cases by obtaining the number of modules corresponding to the black bars. For example, in the case where T1=3 and T2=4, the value is 01 if the number of modules corresponding to the black bars within the δ-distance T1 is "1", and the value is 07 if the number of modules corresponding to the black bars within the δ-distance T1 is "2". Similarly, in the case where T1=3 and T2=3, the value is E2 if the number of modules corresponding to the black bars within the δ-distance T1 is "2", and the value is E8 if the number of modules corresponding to the black bars within the δ-distance T1 is "1".

As described above, the width of the black bar increases or decreases depending on the printing quality. Conventionally, in order to avoid the undesirable effects of the increased or decreased width of the black bar, the number of modules is calculated after correcting the width of the read black bar based on the width of the black bar included in the immediately preceding character which is already demodulated.

Next, a description will be given of an example of a conventional character demodulation method, by referring to FIGS. 4 and 5. FIG. 4 is a flow chart for explaining this conventional character demodulation method. For the sake of convenience, it will be assumed that a character of odd zero 00 is followed by a character of odd two 02 as shown in FIG. 5.

First, the numbers of modules of the δ-distances T1' and T2' shown in FIG. 5 are calculated from a character length C2. According to the standards such as the Universal Product Code (UPC) and the Japan Article Number (JAN), one character is formed by 7 modules. In this case, the length of one module can be obtained by dividing the character length Cn by 7. If the δ-distances T1' and T2' are respectively divided by the length of the module calculated in this manner, it is possible to obtain T1'=2 (modules) and T2'=3 (modules). This character is demodulated based on the demodulation table shown in FIG. 3, and it is found that this character is the odd zero 00 in this case. The number of modules corresponding to the black bars at the end i.e., in region B5 of this character 00 is "1", and this value "1" is stored in a register BRM (not shown) which will be described later.

Thereafter, the character demodulation process shown in FIG. 4 is carried out, as follows, to start demodulation of the next character.

First, a step S1 calculates the numbers of modules of the δ-distances T1 and T2. More particularly, a character length C1 is divided by 7 to obtain the length (C1/7) of one module. A number of modules of the δ-distance T1 and a number T2M of modules of the δ-distance T2 are calculated based on the following formulas, where n=1 for the character length C1.

$$T1M = INT[T1/(Cn/7) + 0.5]$$

$$T2M = INT[T2/(Cn/7) + 0.5]$$

In the above formulas, INT[X+0.5] is a process which is carried out to round the figures after the decimal point. Hence, the number T1M of modules is calculated as "4" for the δ-distance T1, and the number T2M of modules is calculated as "3" for the δ-distance T2.

A step S2 makes access to the demodulation table shown in FIG. 3 using the calculated numbers and T2M of modules of the δ-distances T1 and T2, so as to demodulate the character.

If the character is "1", "7", "2" or "8", the character demodulation cannot be completed solely by the access to the demodulation table. Hence, a step S3 decides whether or not the character is "1", "7", "2" or "8". If the character is "0", "3", "4", "5", "6" or "9" and the decision result in the step S3 is NO, a step S7 calculates a reference number of modules corresponding to the black bars, that is, the number of black bars within the δ-distance T1, and specifically in region B1 based on a known bar code code table. The calculated reference number BRM is stored in the register BRM, and the character demodulation process ends.

On the other hand, if the character is "1", "7", "2" or "8" and the decision result in the step S3 is YES, it is necessary to calculate the number of black bars within the δ-distance T1 and judge whether the character is "1", "7", "2" or "8". But in this case, it is necessary to carry out a process of correcting the width of the black bars in order to eliminate the undesirable effects of the increased or decreased width of the black bars. Hence, a difference between regions B1 and B5 shown in FIG. 5 is obtained, and a number ΔM of modules of this difference is obtained based on the following formula in a step S4 (FIG. 4). In this case, ΔM=1.

$$\Delta M = INT[(B1 - B5)/(Cn/7) + 0.5]$$

Then, a number B1M of modules within the region B1 is obtained based on the following formula in a step S5, that is, by adding to the number ΔM the number BRM of modules corresponding to the black bars within the region B5 which was stored in the register BRM when obtaining the character length C2. In this case, BRM=1, and B1M=2.

$$B1M = BRM + \Delta M$$

The number B1M of modules within the region B1 is obtained in the above described manner, and a step S6 judges whether the character is "1", "7", "2" or "8" based on the number B1M. In this case, it is judged that the character is the odd two 02. Thereafter, the step S7 described above is carried out to store the calculated reference number of modules corresponding to the black bars into the register BRM for use in demodulating the next character, and the character demodulation process ends.

The conventional character demodulation process is effective for reducing the undesirable effects of the uniformly increased or decreased width of the black bars due to the poor printing quality or the like. However, since the operation process is carried out using the black bar within the adjacent character as a reference, there is a problem in that a read error occurs if the respective widths of the black bars undergo a non-uniform increase or decrease, such as when the label is curved.

SUMMARY OF THE INVENTION

Accordingly, it is a general object of the present invention to provide a novel and useful bar code demodulating method in which the problem described above is eliminated.

Another and more specific object of the present invention is to provide a bar code demodulating method comprising the steps of (a) measuring lengths of successive characters of a bar code, (b) obtaining a ratio of the length of a demodulating character which is to be demodulated and the length of a previous character which is demodulated prior to the demodulating character, and (c) demodulating the demodulating character by correcting a width of at least one reference bar within the previous character based on the ratio and by obtaining a number of modules within the demodulating character based on the correction. According to the bar code demodulating method of the present invention, it is possible to accurately demodulate the bar code even if the width of the bars increase or decrease non-uniformly, such as the case where the bar code is printed on a curved label or article. As a result, the bar code reading accuracy is considerably improved according to the present invention.

Still another object of the present invention is to provide a bar code demodulating method comprising the steps of (a) obtaining a number of modules corresponding to all of black bars within a demodulating character of a bar code which is to be demodulated based on at least one reference black bar within a previous character which is demodulated prior to the demodulating character, (b) obtaining a number of modules corresponding to all of white bars within the demodulating character based on at least one reference white bar within the previous character, and (c) demodulating the demodulating character based on the numbers of modules obtained in the steps (a) and (b). According to the bar code demodulating method of the present invention, it is possible to accurately demodulate the bar code even if the width of the bars increase or decrease non-uniformly, such as the case where the bar code is printed on a curved label or article. As a result, the bar code reading accuracy is considerably improved according to the present invention.

A further object of the present invention is to provide a bar code demodulating method comprising the steps of (a) obtaining a number of modules corresponding to black bars within a demodulating character of a bar code which is to be demodulated based on a first black bar within a previous character which is demodulated prior to the demodulating character, (b) obtaining a number of modules corresponding to the black bars within the demodulating character based on a second black bar within the previous character, where the second black bar is different from the first black bar, and (c) demodulating the demodulating character based on the numbers of modules obtained in the steps (a) and (b). According to the bar code demodulating method of the present invention, it is possible to accurately demodulate the bar code even if the width of the bars increase or decrease non-uniformly, such as the case where the bar code is printed on a curved label or article. As a result, the bar code reading accuracy is considerably improved according to the present invention.

Another object of the present invention is to provide a bar code demodulating method comprising the steps of (a) measuring lengths of successive characters of a bar code, (b) obtaining a ratio of the length of a demodulating character which is to be demodulated and the length of a previous character which is demodulated prior to the demodulating character, and (c) demodulating the demodulating character only if the ratio falls within a first predetermined range when the demodulation is possible using only bars within the demodulating character, and demodulating the demodulating character only if the ratio falls within a second predetermined range when the demodulation is impossible using only the bars within the demodulating character and the demodulation is made using at least one reference bar within the previous character, where the first and second predetermined ranges are mutually different. According to the bar code demodulating method of the present invention, it is possible to accurately demodulate the bar code even if the width of the bars increase of decrease non-uniformly, such as the case where the bar code is printed on a curved label or article. As a result, the bar code reading accuracy is considerably improved according to the present invention.

Other objects and further features of the present invention will be apparent from the following detailed description when read in conjunction with the accompanying drawings.

BRIEF DESCRIPTION OF THE DRAWINGS

FIG. 1 in parts (A), (B) and (C) is a diagram for explaining δ-distances for cases where the width of black bars increases and decreases;

FIG. 2 is a diagram for explaining discrimination of bar codes based on the δ-distances;

FIG. 3 is a diagram for explaining a demodulation table;

DESCRIPTION OF THE PREFERRED EMBODIMENTS

Figure 6:
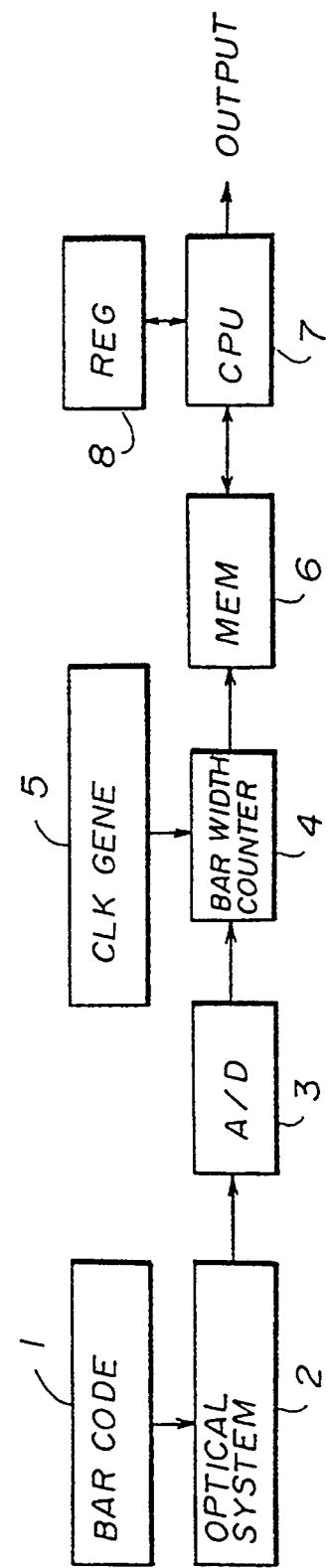
FIG. 6 is a system block diagram showing an embodiment of a bar code reader used in the present invention.

FIG. 6 shows an embodiment of a bar code reader to which the present invention is applied. In FIG. 6, the bar code reader includes an optical system 2 for optically demodulating a bar code 1 which is printed on a label or an article, for example, an analog-to-digital (A/D) converter 3, a bar width counter 4, a clock generator 5, a memory 6, a central processing unit (CPU) 7, and a register 8 which corresponds to the register BRM described above.

Figure 5:
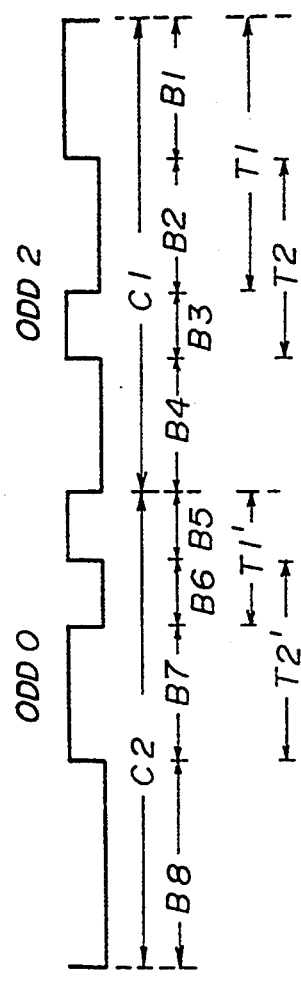
FIG. 5 is a diagram showing two successive characters for explaining the conventional character demodulation method.

The optical system 2 includes a known photoelectric conversion means (not shown) such as a charge coupled device (CCD) for converting the bar code 1, which is optically read, into an electrical signal. The electrical signal is converted by the A/D converter 3 into a binary signal as shown in FIG. 5, for example. The bar width counter 4 counts output clocks (i.e., clock pulses) of the clock generator 5 for the lengths of the black region B1, the white region B2 and the like shown in FIG. 5. Hence, counted values corresponding to the lengths of the regions B1, B2, . . . are output from the bar width counter 4 and temporarily stored in the memory B as data. The CPU 7 carries out a character demodulation process which will be described later in conjunction with FIG. 7 using the data stored in the memory 6. In addition, the CPU 7 stores the reference number of black bars into the register 8.

Figure 4:
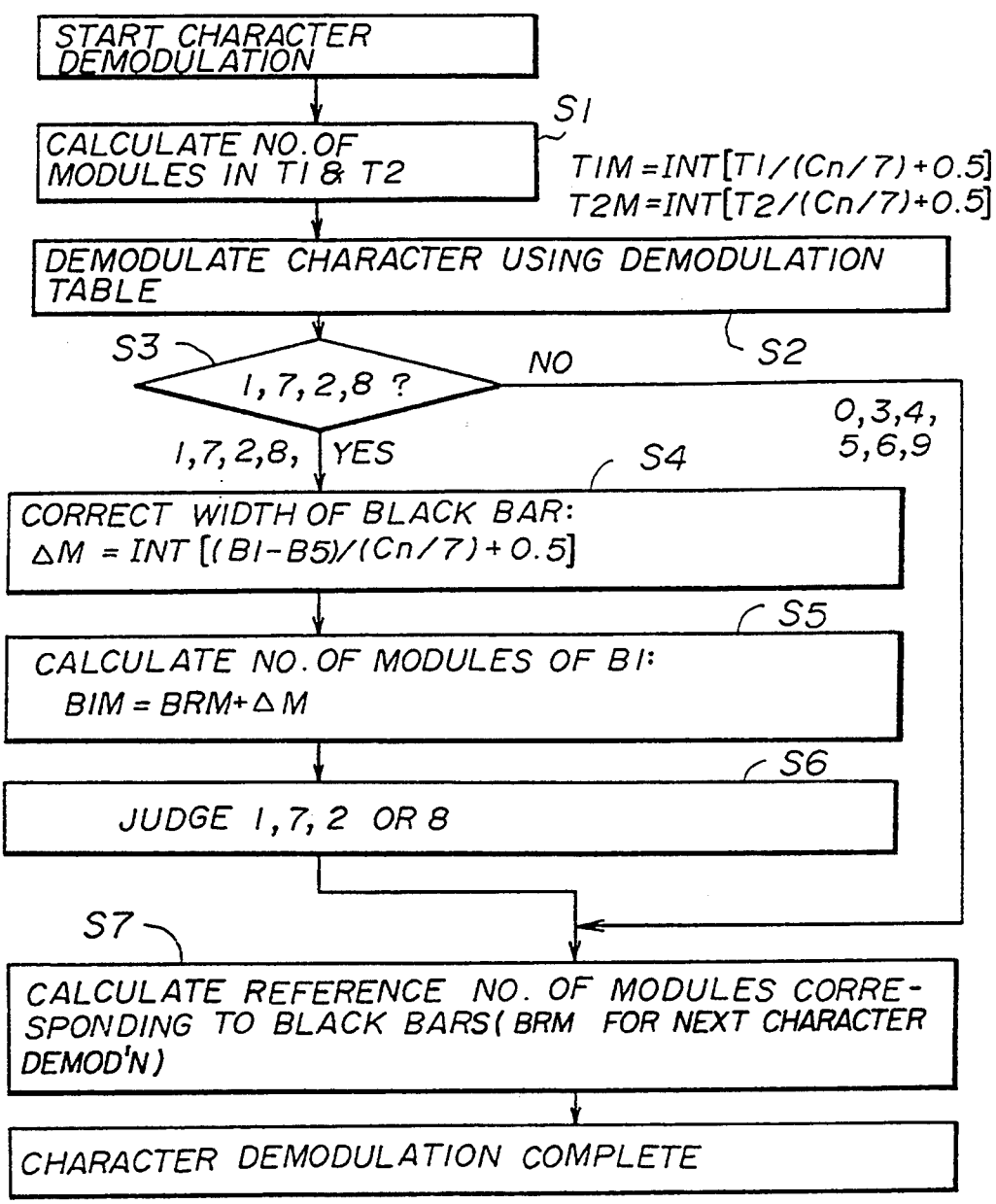
FIG. 4 is a flow chart for explaining a conventional character demodulation method.
Figure 7:
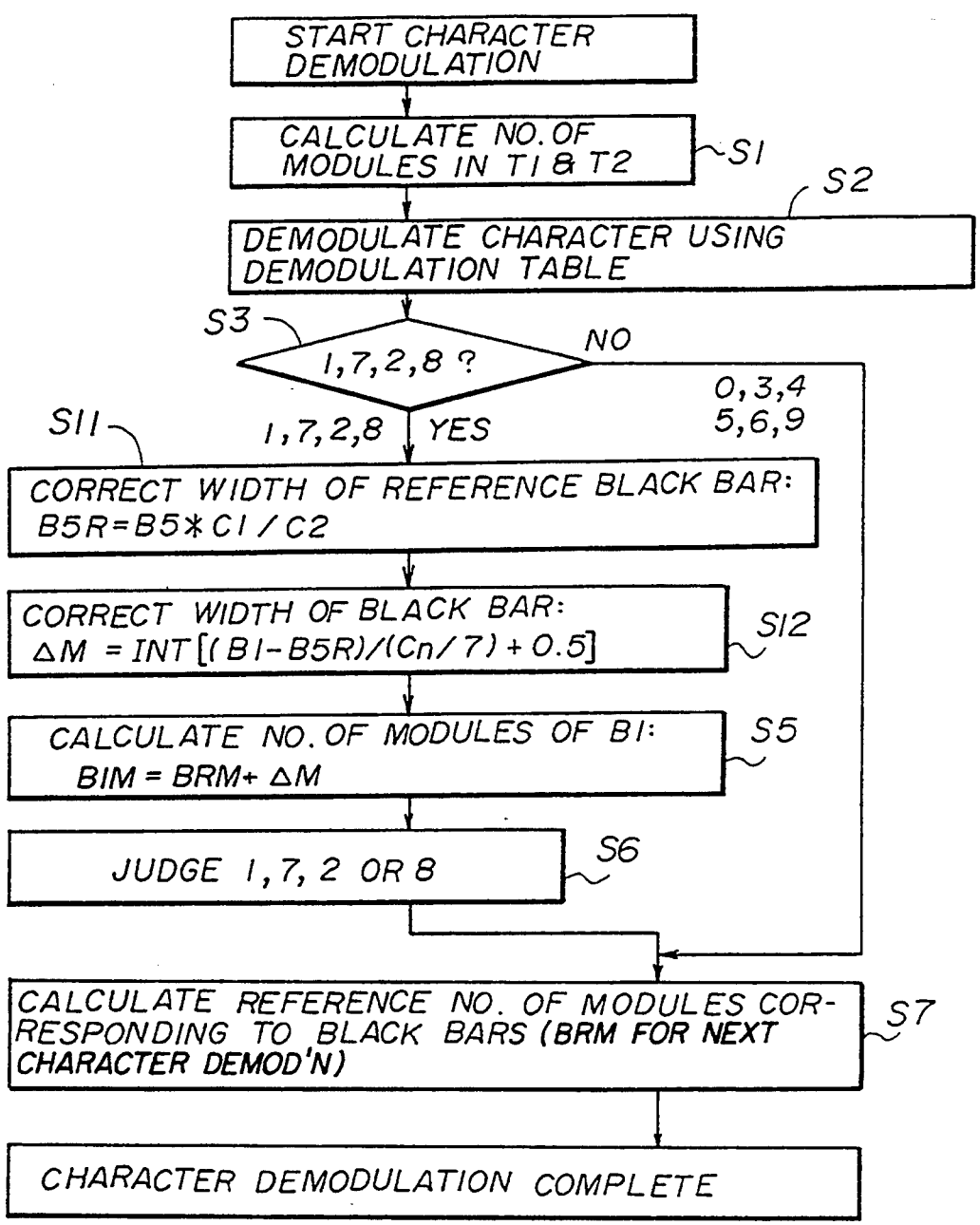
FIG. 7 is a flow chart for explaining a first embodiment of a bar code demodulating method according to the present invention.

Next, a description will be given of a first embodiment of the bar code demodulating method according to the present invention, by referring to FIG. 7. The character demodulation process shown in FIG. 7 is carried out by the CPU 7 shown in FIG. 6. For the sake of convenience, it will be assumed that the character 02 follows the character 00 as in the case shown in FIG. 5. In FIG. 7, those steps which are the same as those corresponding steps shown in FIG. 4 are designated by the same reference numerals.

The data related to the regions B1, B2, . . . , B8 shown in FIG. 5 are stored in the memory 6. The step S1 divides each of the character lengths C1 and C2 by 7, and calculates the number T1M of modules of the δ-distance T1 and the number T2M of modules of the δ-distance T2 based on the following formulas.

$$T1M = INT[T1/(Cn/7) + 0.5](Cn = C1)$$

$$T2M = INT[T2/(Cn/7) + 0.5](Cn = C1)$$

The step S2 makes access to the demodulation table shown in FIG. 3 using the numbers T1M and T2M of modules of the δ-distances T1 and T2, so as to demodulate the characters 02 having the character length C1. In this case, the CPU 7 carries out the calculation and obtains T1M=4 and T2M=3, and demodulates the character 02 by making access to the demodulation table using T1M=4 and T2M=3.

If the character is "1", "7", "2" or "8", the character demodulation cannot be completed solely by the access to the demodulation table. Hence, the step S3 decides whether or not the character is "1", "7", "2" or "8". If the character is "0", "3", "4", "5", "6" or "9" and thus the decision result in the step S3 is NO, the step S7 calculates the reference number BRM of modules corresponding to the black bars, that is, the number of black bars within the δ-distance T1, for use in demodulating the next successive character, based on a known bar code code table. The calculated reference number is stored in the register BRM of the register 8, and the character demodulation process ends.

On the other hand, if the character is "1", "7", "2" or "8" and thus the decision result in the step S3 is YES, it is necessary to calculate the number of modules corresponding to the black bars within the δ-distance T1 and thus within B1, and judge based on the calculated number of module whether the character is "1", "7", "2" or "8". In this embodiment, a reference bar width B5 of the reference black bars, which is necessary to calculate the number of black bars within the δ-distance T1, is corrected in a step S11 based on the following formula. In other words, a ratio of the character lengths C1 and C2 is multiplied by the length of the region B5.

$$B5R = B5*C1/C2$$

Thereafter, the number ΔM of modules of the difference between the regions B1 and B5 is obtained based on the following formula in a step S12, similarly to the step S4 shown in FIG. 4. In this case, ΔM=1.

$$\Delta M = INT[(B1 - B5R)/(Cn/7) + 0.5]$$

Then, the number B1M of modules within the region B1 is obtained based on the following formula in the step S5, that is, by adding to the number ΔM the number BRM of modules corresponding to the black bars within the region B5 which is stored in the register BRM of the register 8.

$$B1M = BRM + \Delta M$$

The number B1M of modules within the region B1 is obtained in the above described manner, and the step S6 judges whether the character is "1", "7", "2" or "8" based on the number B1M. Thereafter, the step S7 described above is carried out to store the calculated reference number BRM of modules corresponding to the black bars into the register BRM of the register 8 for use in demodulating the next character, and the character demodulation process ends.

According to this first embodiment, the reference bar width of the black bar within the character which is used as a reference and immediately precedes the character which is the subject of the discrimination is corrected, using the ratio C1/C2 of the character lengths C1 and C2, that is, the length of the character which is the subject of the demodulation and the length of the immediately preceding character which is used as the reference. For this reason, it is possible to correct the non-uniform increase or decrease in the bar width caused by the bar code which is printed on a curved label or article, and enable accurate character demodulation. Of course, it is possible to make the character demodulation effective only if the ratio C1/C2 falls within a predetermined range.

Figure 8:
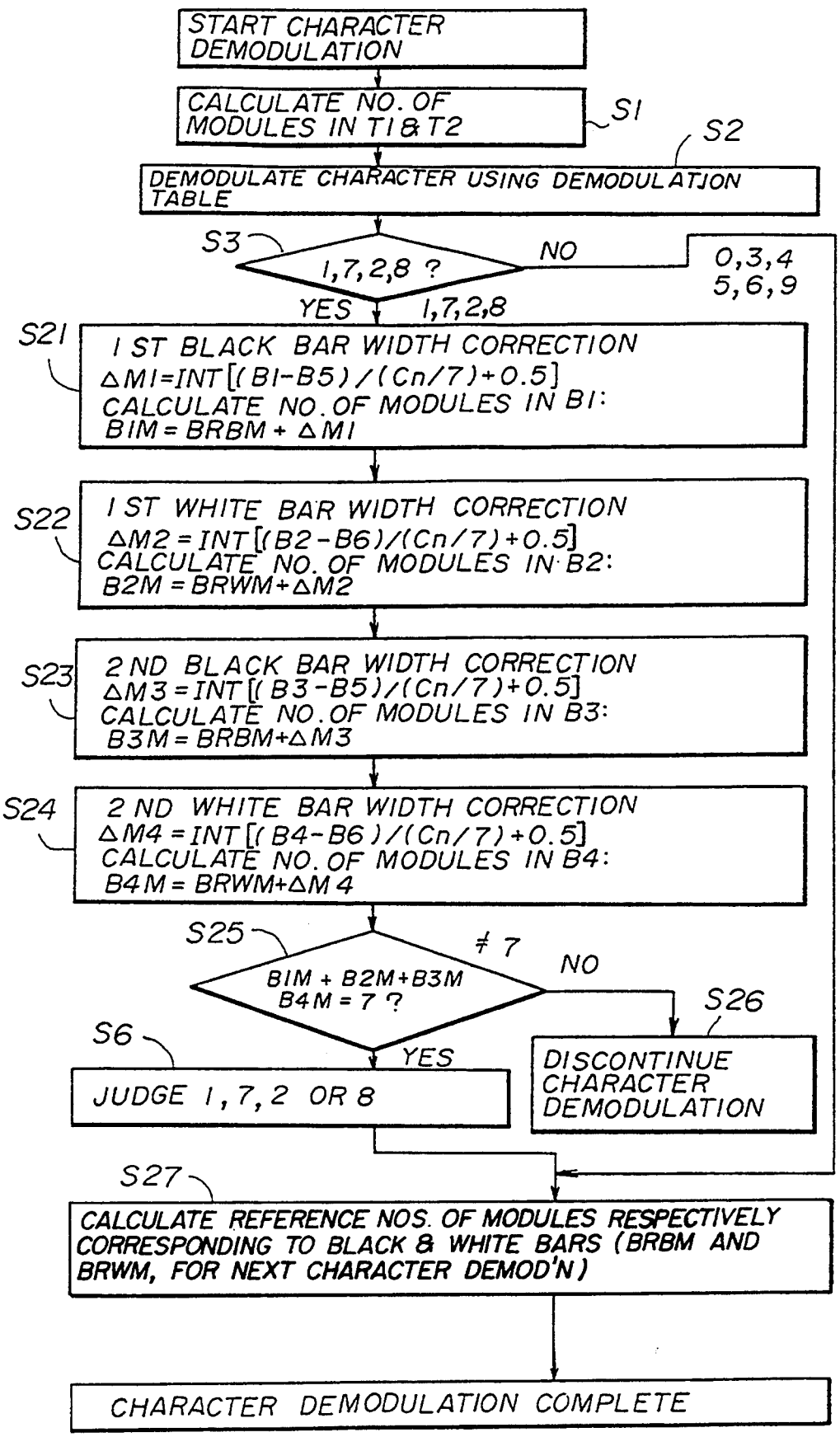
FIG. 8 is a flow chart for explaining a second embodiment of the bar code demodulating method according to the present invention.

Next, a description will be given of a second embodiment of the bar code demodulating method according to the present invention, by referring to FIG. 8. The character demodulation process shown in FIG. 8 is carried out by the CPU 7 shown in FIG. 6. For the sake of convenience, it will be assumed that the character 02 follows the character 00 as in the case shown in FIG. 5. In FIG. 8, those parts which are the same as those corresponding parts in FIG. 7 are designated by the same reference numerals.

in this second embodiment, in order to prevent erroneous reading and demodulation even if the bar width undergoes a non-uniform increase or decrease due to the bar code printed on a curved label, article or the like, the total number of modules within the character is calculated not only by use of the black bar within the immediately preceding character but also by use of the white bar within the immediately preceding character. A check is made to determine whether or not the total number of modules within the character is 7, for example.

The number of modules corresponding to the black bars is obtained by use of the black bar within the immediately preceding character. Similarly, the number of modules corresponding to the white bars is obtained by use of the white bar within the immediately preceding character. If the total number of modules corresponding to the black and white bars within the character which is subject to the demodulation is not 7, for example, the series of data is regarded as being invalid.

In FIG. 8, the step S1 divides each of the character lengths C1 and C2 by 7, and calculates the number T1M of modules of the δ-distance T1 and the number T2M of modules of the δ-distance T2, based on the following formulas:

$$T1M = INT[T1/(Cn/7) + 0.5](Cn = C1)$$

$$T2M = INT[T2/(Cn/7) + 0.5](Cn = C2)$$

The step S2 makes access to the demodulation table shown in FIG. 3 using the numbers T1M and T2M of modules of the δ-distances T1 and T2, so as to demodulate the characters. In this case, the CPU 7 carries out the calculation and obtains T1M=4 and T2M=3, and demodulates the characters by making access to the demodulation table using T1M=4 and T2M=3.

If the character is "1", "7", "2" or "8", the character demodulation cannot be completed solely by the access to the demodulation table. Hence, the step S3 decides whether or not the character is "1", "7", "2" or "8". If the character is "0", "3", "4", "5", "6" or "9" and thus the decision result in the step S3 is NO, a step S27 calculates the reference number of modules corresponding to the black bars, that is, the number of black bars within the δ-distance T1 (region B1), based on a known bar code code table, and also calculates the reference number of modules corresponding to the white bars, that is, the number of white bars within the δ-distance T1 (region B2). The calculated reference number of the modules corresponding to the black bars is stored in a register BRM, the calculated reference number of modules corresponding to the white bars is stored in a register BRW, and the character demodulation process ends. The registers BRM and BRW are parts of the register 8 shown in FIG. 6 in this embodiment, however, independent registers may provided as the registers BRM and BRW.

On the other hand, if the character is "1", "7", "2" or "8" and thus the decision result in the step S3 is YES, it is necessary to calculate the number of black bars within the δ-distance T1 and judge whether the character is "1", "7", "2" or "8". In this embodiment, the widths of the black and white bars are corrected by steps S21 through S24.

The step S21 makes a first correction with respect to the width of the black bar based on the following formula, where ΔM1 denotes the number of modules of the difference between the regions B1 and B5.

$$\Delta M1 = INT[(B1 - B5)/(Cn/7) + 0.5]$$

Then, the number B1M of modules corresponding to the black bars within the region B1 is calculated by adding to the number ΔM1 the number BRBM of modules corresponding to the black bars within the region B5 which is stored in the register BRM.

The step S22 makes a first correction with respect to the width of the white bar based on the following formula, where ΔM2 denotes the number of modules of the difference between the regions B2 and B6. As shown in FIG. 5, the regions B2 and B6 respectively are the white regions occurring first in the respective characters C1 and C2.

$$\Delta M2 = INT[(B2-B6)/(Cn/7)+0.5]$$

Then, the number B2M of modules corresponding to the white bars within the region B2 is calculated by adding to the number ΔM2 the number BRWM of modules corresponding to the white bars within the region B6 which is stored in the register BRW.

The step S23 makes a third correction with respect to the width of the black bar based on the following formula, where ΔM3 denotes the number of modules of the difference between the regions B3 and B5. As shown in FIG. 5, the region B3 is the black region occurring second in the character C1.

$$\Delta M3 = INT[(B3-B5)/(Cn/7)+0.5]$$

Then, the number B3M of modules corresponding to the black bars within the region B3 is calculated by adding to the number ΔM3 the number BRBM of modules corresponding to the black bars within the region B5 which is stored in the register BRM.

The step S24 makes a fourth correction with respect to the width of the white bar based on the following formula, where ΔM4 denotes the number of modules of the difference between the regions B4 and B6. As shown in FIG. 5, the region B4 is the white region occurring second in the character C1.

$$\Delta M4 = INT[(B4-B6)/(Cn/7)+0.5]$$

Then, the number B4M of modules corresponding to the white bars within the region B4 is calculated by adding to the number ΔM4 the number BRWM of modules corresponding to the white bars within the region B6 which is stored in the register BRW.

A step S25 adds the numbers B1M, B2M, B3M and B4M to determine whether or not the sum is 7. If the decision result in the step S25 is NO, a step S26 invalidates the series of data and discontinues the character demodulation process.

On the other hand, if the decision result in the step S25 is YES, the step S6 judges whether the character is "1", "7", "2" or "8" based on the number B1M. Thereafter, the step S27 described above is carried out to store the calculated reference number of modules corresponding to the black bars within the region B1 into the register BRB and the calculated reference number of modules corresponding to the white bars within the region B2 into the register BRW for use in demodulating the next character so as to prepare for the next character demodulation, and the character demodulation process ends.

According to this second embodiment, the correction of the width of the bars is not only carried out with respect to the back bars but also with respect to the white bars. In addition, the character demodulation is judged as being valid if the total number of modules, corresponding to the black and white bars within the character, is equal to the regular (or standardized) total number of modules within the character of the bar code, where the regular total number of modules within the character is equal to 7 in this embodiment. As a result, it is possible to read the bar code with a further improved accuracy.

Of course, the widths of the reference black bars and the reference white bars may also be corrected in this embodiment, similarly to the first embodiment. For example, the correction may be made similarly to the above by obtaining a ratio of the length of the character which is to be demodulated and the length of the immediately preceding character which has been demodulated.

Figure 9:
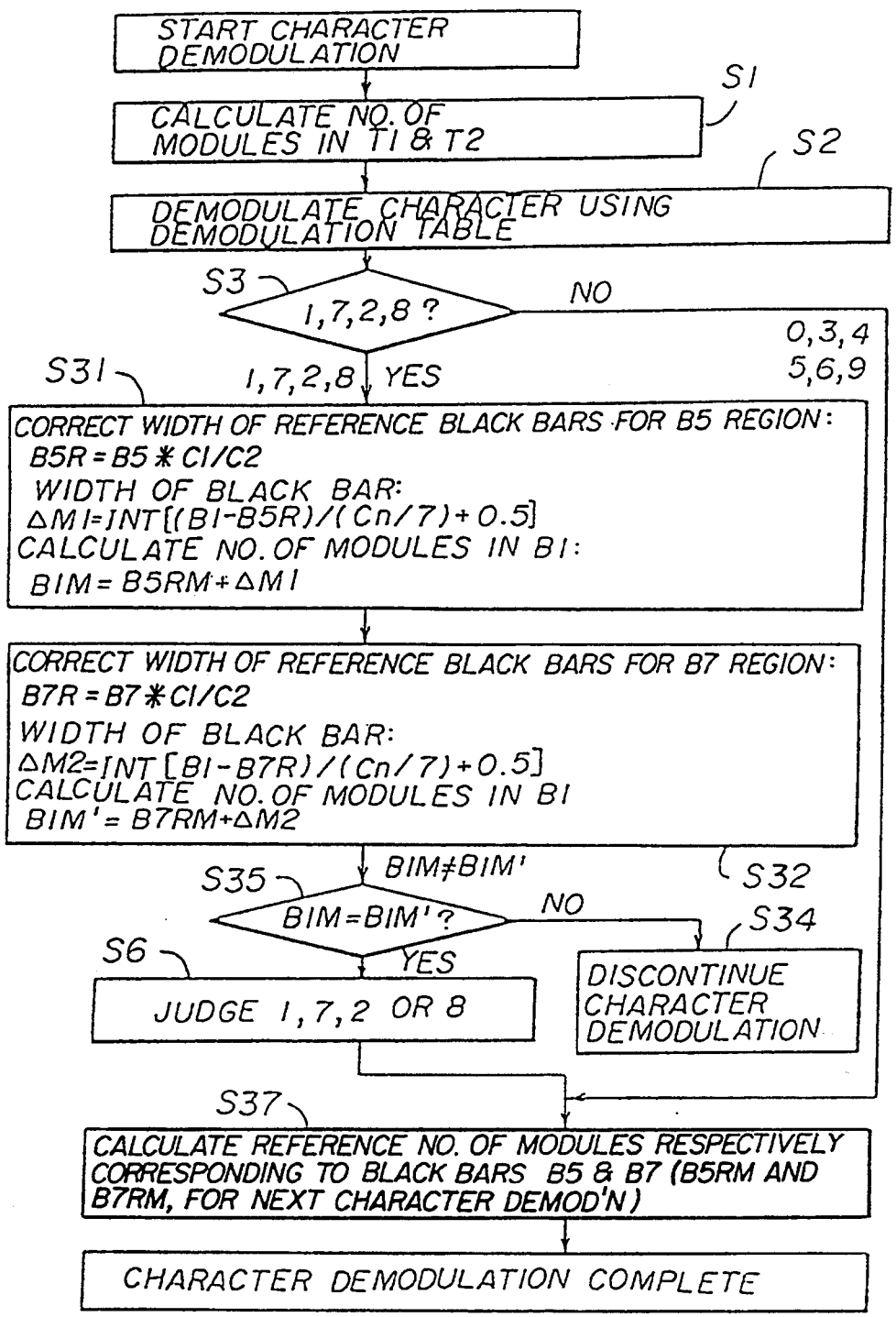
FIG. 9 is a flow chart for explaining a third embodiment of the bar code demodulating method according to the present invention.

Next, a description will be given of a third embodiment of the bar code demodulating method according to the present invention, by referring to FIG. 9. The character demodulation process shown in FIG. 9 is carried out by the CPU 7 shown in FIG. 6. For the sake of convenience, it will be assumed that the character E2 follows the character E0 as in the case shown in FIG. 5. In FIG. 9, those parts which are the same as those corresponding parts in FIG. 7 are designated by the same reference numerals.

In this third embodiment, in order to prevent erroneous reading and demodulation even if the bar width undergoes a non-uniform increase or decrease due to the bar code being printed on a curved label, article or the like, the number of modules corresponding to the black bars within the character is calculated not only by use of the last black bar within the immediately preceding character but also by use of the black bar which precedes the last black bar within the immediately preceding character. A check is made to determine whether or not the total number of modules corresponding to the black bars within the character is the same for the two cases, that is, a first case where the width of the last black bar within the immediately preceding character is used and a second case where the width of the black bar preceding the last black bar within the immediately preceding character is used. More particularly, the calculation of the number of modules corresponding to the black bars is made using not only the width of the black region B5 of the character 00 having the character length C2 in FIG. 1 but also the width of the preceding black region B7 of the character 00 having the character length C2 in FIG. 5.

In FIG. 9, the step S1 divides the character length C1 by 7, and calculates the number T1M of modules of the δ-distance within C1 and the number T2M of modules of the δ-distance within C2 based on the following formulas.

$$T1M = INT[T1/(Cn/7)+0.5](Cn=C1)$$

$$T2M = INT[T2/(Cn/7)+0.5](Cn=C1)$$

The step S2 makes access to the demodulation table shown in FIG. 3 using the numbers T1M and T2M of modules of the δ-distances T1 and T2, so as to demodulate the character 02 having the character length C1. In this case, the CPU 7 carries out the calculation and obtains T1M=4 and T2M=3, and demodulates the character 02 by making access to the demodulation table using T1M=4 and T2M=3.

If the character is "1", "7", "2" or "8", the character demodulation cannot be completed solely by the access to the demodulation table. Hence, the step S3 decides whether or not the character is "1", "7", "2" or "8". If the character is "0", "3", "4", "5", "6" or "9" and thus the decision result in the step S3 is NO, a step S37 calculates the reference number of modules corresponding to the black bars within the δ-distance T1 (region B1), based on a known bar code code table and to be used when demodulating the next character, and also calculates the reference number of modules corresponding to the black bars within the δ-distance T2 (region B3), likewise to be used when demodulating the next character. The calculated reference number of the modules corresponding to the black bars within the region B1 is stored in a register B5RM, for use when demodulating the next character, the calculated reference number of modules corresponding to the black bars within the region B3 is stored in a register B7RM, likewise for use when demodulating the next character and the character demodulation process ends. The registers B5RM and B7RM are parts of the register 8 shown in FIG. 6 in this embodiment; however, independent registers may be provided as the registers B5RM and B7RM.

On the other hand, if the character is "1", "7", "2" or "8" and thus the decision result in the step S3 is YES, it is necessary to calculate the number of modules corresponding to the black bars in B1 within the δ-distance T1 and judge, based on the calculated number of modules whether the character is "1", "7", "2" or "8". In this embodiment, a step S31 calculates the number of modules corresponding to the black bars within the region B5 of C2 in the following manner of for use as a reference when correcting B1.

Specifically, a reference bar width B5 of the reference number of modules corresponding to black bars, which is necessary to calculate the number of black bars within the region B1 of the character C1, is corrected based on the following formula. In other words, a ratio of the character lengths C1 and C2 is multiplied by the length of the region B5 so as to correct the length of B5 by the ratio C1/C2.

$$B5R = B5 * C1/C2$$

In addition, the number $\Delta M1$ of modules of the difference between the regions B1 and B5 is obtained based on the following formula.

$$\Delta M1 = INT[(B1 - B5R)/(Cn/7) + 0.5]$$

Then, the number B1M of modules corresponding to the black bars within the region B1 is obtained based on the following formula, that is, by adding to the number $\Delta M1$ the number B5RM of modules corresponding to the black bars within the region B5 which is stored in the register B5RM of the register 8.

$$B1M = B5RM + \Delta M1$$

In this embodiment, a step S32 further calculates the number of modules within the region B1 of C2 in the following manner.

That is, a reference bar width B7 of the reference black bar, which is necessary to calculate the number of black bars within the region B1 of the character C1, is corrected based on the following formula. In other words, a ratio of the character lengths C1 and C2 is multiplied by the length of the region B7 so as to correct the length of B7 by the ratio C1/C2.

$$B7R = B7 * C1/C2$$

In addition, the number $\Delta M2$ of modules of the difference between the regions B1 and B7 is obtained based on the following formula.

$$\Delta M2 = INT[(B1 - B7R)/(Cn/7) + 0.5]$$

Then, the number B1M' of modules corresponding to the black bars within the region B1 is obtained based on the following formula, that is, by adding to the number $\Delta M2$ the number B7RM of modules corresponding to the black bars within the region B7 which is stored in the register B7RM of the register 8.

$$B1M' = B7RM + \Delta M2$$

A step S33 decides whether or not the number B1M obtained in the step S31 from B5 is equal to the number B1M' obtained in the step S32 from B7. If the bar code is read correctly, the number B1M should be equal to the number B1M'. Hence, if the decision result in the step S33 is NO, the character demodulation process is discontinued in a step S34.

On the other hand, if the decision result in the step S33 is YES, the step S6 judges whether the character is "1", "7", "2" or "8" based on the number B1M. Thereafter, the step S37 described above is carried out to store the calculated reference number of modules, corresponding to the black bars within the region B1 in the register B5RM and the calculated reference number of modules corresponding to the black bars within the region B3, in the register B7RM for use when demodulating the next character, and the character demodulation process ends.

In this third embodiment, it is also possible to additionally carry out the correction used in the first embodiment and/or the second embodiment described above. For example, the correction may be made similarly to the above by obtaining a ratio of the length of the character which is to be demodulated and the length of the immediately preceding character which has been demodulated.

Figure 10:
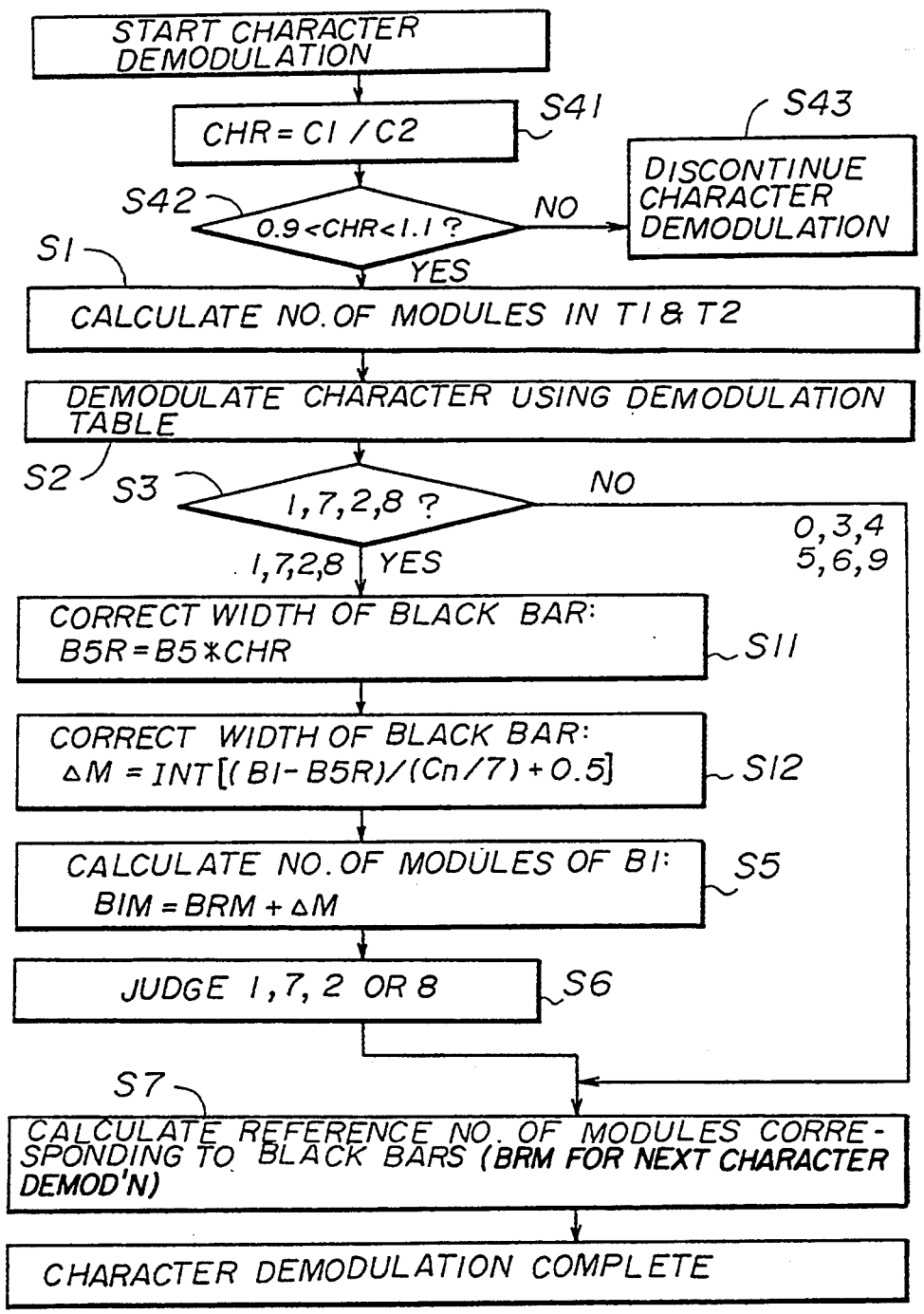
FIG. 10 is a flow chart for explaining a fourth embodiment of the bar code demodulating method according to the present invention.

Next, a description will be given of a fourth embodiment of the bar code demodulating method according to the present invention, by referring to FIG. 10. The character demodulation process shown in FIG. 10 is carried out by the CPU 7 shown in FIG. 6. For the sake of convenience, it will be assumed that the character E2 follows the character E0 as in the case shown in FIG. 5. In FIG. 10, those parts which are the same as those corresponding parts in FIG. 7 are designated by the same reference numerals, and a description thereof will be omitted.

In this fourth embodiment, in order to prevent erroneous reading and demodulation even if the bar width undergoes a non-uniform increase or decrease due to the bar code being printed on a curved label, article or the like, a reference width of a reference black bar within a reference character which immediately precedes the character which is the subject of the demodulation, is corrected using the lengths of the character which is the subject of the demodulation and the reference character. In addition, if a difference between the character lengths is greater than or equal to a predetermined value, for example of 10%, the demodulation of the series of data is discontinued.

In FIG. 10, a step S41 compares the character length C1 with the character length C2 of the immediately preceding character C2, so as to obtain a ratio CHR which is described by the following formula.

$$CHR = C1/C2.$$

A step S42 decides whether or not the ratio CHR falls within a predetermined range. More particularly, the step S42 decides whether or not the difference between the character lengths C1 and C2 is 10% or less, that is, $0.9 < CHR < 1.1$. If the decision result in the step S42 is NO, a step S43 discontinues the character demodulation.

On the other hand, if the decision result in the step S42 is YES, the steps S1 through S3 are carried out similarly to the first embodiment. In addition, the step S7 is carried out similarly to the first embodiment shown in FIG. 7 if the decision result in the step S3 is NO. If the decision result in the step S3 is YES, the steps S11, S12, S5, S6 and S7 are carried out similarly to the first embodiment shown in FIG. 7.

Figure 11:
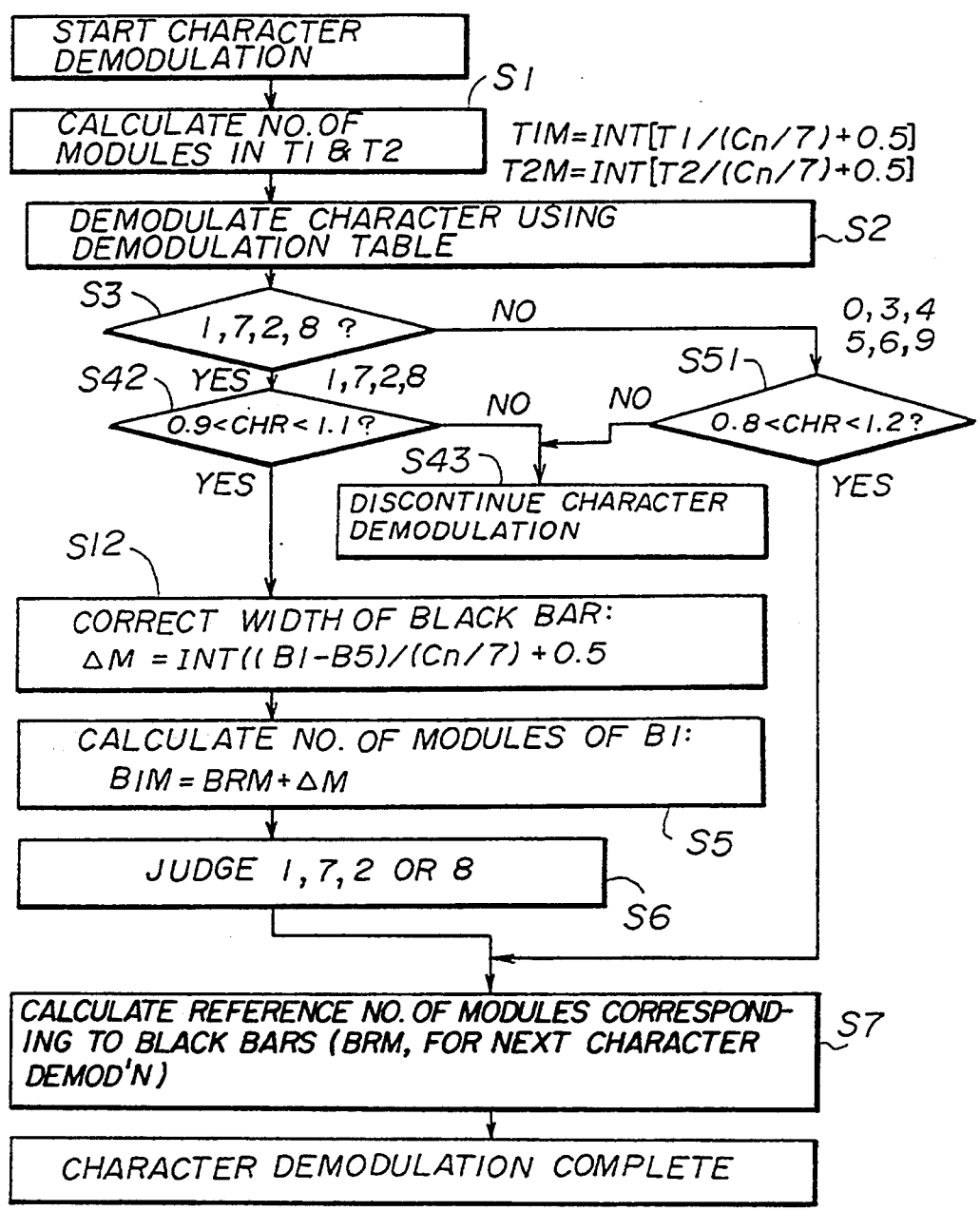
FIG. 11 is a flow chart for explaining a fifth embodiment of the bar code demodulating method according to the present invention.

Next, a description will be given of a fifth embodiment of the bar code demodulating method according to the present invention, by referring to FIG. 11. The character demodulation process shown in FIG. 11 is carried out by the CPU 7 shown in FIG. 6. For the sake of convenience, it will be assumed that the character E2 follows the character E0 as in the case shown in FIG. 5. In FIG. 11, those parts which are the same as those corresponding parts in FIGS.7 and 10 are designated by the same reference numerals, and a description thereof will be omitted.

In this fifth embodiment, in order to prevent erroneous reading and demodulation even if the bar width undergoes a non-uniform increase or decrease due to the bar code being printed on a curved label, article or the like, a reference width of a reference black bar within a reference character which immediately precedes the character which is the subject of the demodulation is corrected, using the lengths of the character which is the subject of the demodulation and the reference character, if the character is "1", "7", "2" or "8" which requires the use of the black bar within the reference character in order to demodulate the character. In addition, if a difference between the character lengths is greater than or equal to a predetermined value of 10%, for example, the demodulation of the series of data is discontinued. But if the character is other than "1", "7", "2" and "8", the demodulation of the series of data is discontinued only if the difference between the character lengths is greater than or equal to a predetermined value of 20%, for example.

In FIG. 11, if the decision result in the step S3 is YES, the step 42 decides whether or not $0.9 < CHR < 1.1$, where $CHR = C1/C2$. If the decision result in the step S42 is NO, the character demodulation is discontinued in the step S43. On the other hand, the steps S12, S6 and S7 are carried out similarly to the first embodiment if the decision result in the step S42 is YES.

On the other hand, if the decision result in the step S3 is NO, a step S51 decides whether or not $0.8 < CHR < 1.2$. The character demodulation is discontinued in the step S43 if the decision result in the step S51 is NO. But if the decision result in the step S51 is YES, the series of data is regarded as being valid and the process advances to the step S7, thereby completing the character demodulation process.

Figure 12:
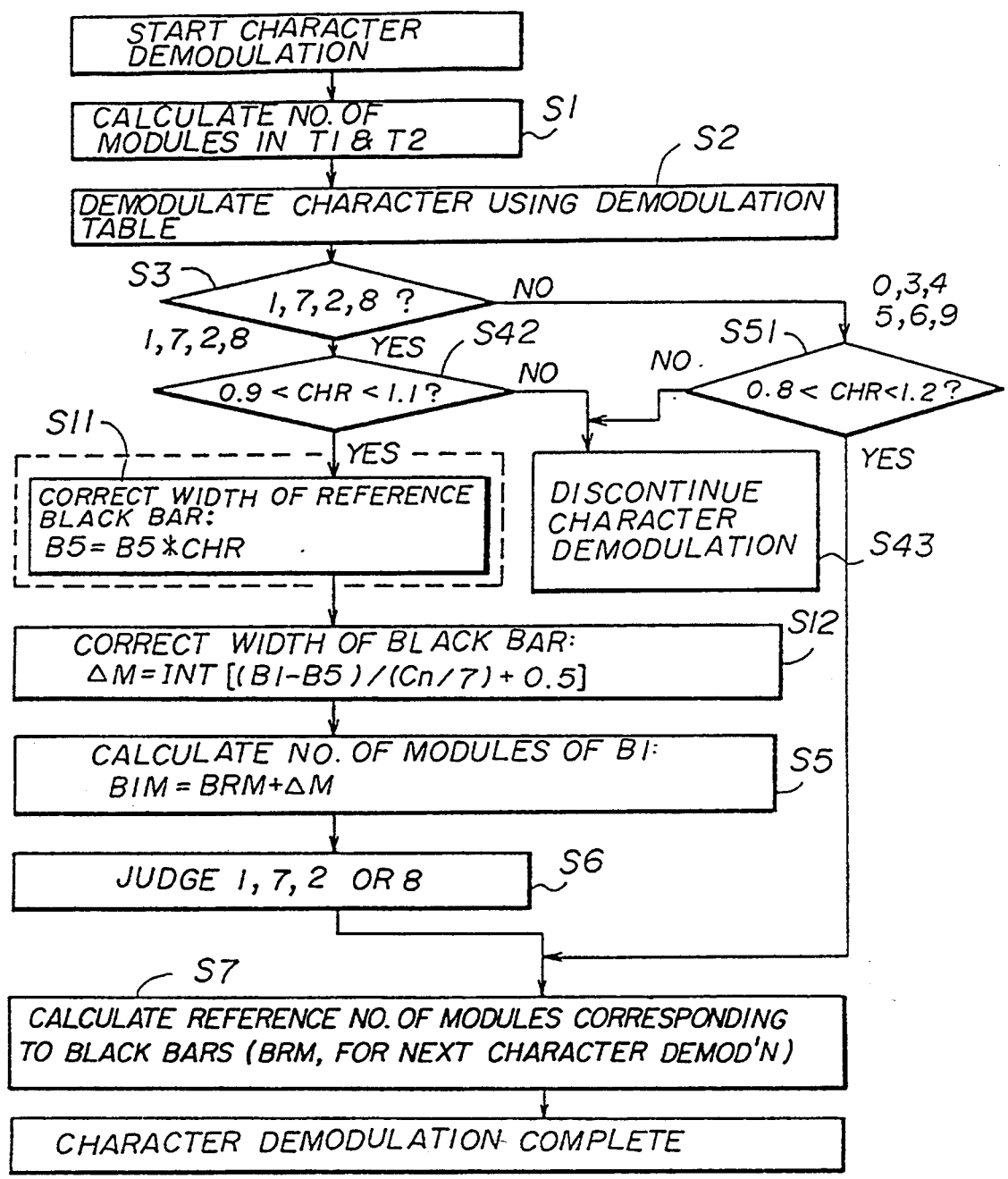
FIG. 12 is a flow chart for explaining a sixth embodiment of the bar code demodulating method according to the present invention.

Next, a description will be given of a sixth embodiment of the bar code demodulating method according to the present invention, by referring to FIG. 12. The character demodulation process shown in FIG. 12 is carried out by the CPU 7 shown in FIG. 6. For the sake of convenience, it will be assumed that the character E2 follows the character E0 as in the case shown in FIG. 5. In FIG. 12, those parts which are the same as those corresponding parts in FIG. 11 are designated by the same reference numerals, and a description thereof will be omitted.

In this sixth embodiment, the step S11 of the first embodiment shown in FIG. 7 is carried out before the step S12, similarly to the fourth embodiment shown in FIG. 10. Otherwise, the sixth embodiment is the same as the fifth embodiment described above.

Of course, it is possible to employ an arbitrary combination of the methods employed in the first through sixth embodiments.

In addition, the embodiments obtain the ratio of the lengths of the character which is the subject of the demodulation and the immediately preceding character. However, instead of using the length of the immediately preceding character, it is possible to use the length of a preceding character which precedes the immediately preceding character by one or more characters.

Further, the present invention is not limited to these embodiments, but various variations and modifications may be made without departing from the scope of the present invention.

What is claimed is:

1. A bar code demodulating method comprising the steps of:
    (a) measuring lengths of successive characters of a bar code;
    (b) obtaining a ratio of the length of a demodulating character which is to be demodulated and the length of a previous character which is demodulated prior to said demodulating character; and
    (c) demodulating said demodulating character by correcting a width of at least one reference bar within the previous character based on said ratio.

2. The bar code demodulating method as claimed in claim 1, wherein said step (c) demodulates said demodulating character only if said ratio falls within a predetermined range.

3. The bar code demodulating method as claimed in claim 1, wherein said step (c) comprises the sub-steps of:
    (c1) obtaining a number of modules corresponding to black bars within a demodulating character of a bar code which is to be demodulated based on a first black bar within a previous character which is demodulated prior to said demodulating character;
    (c2) obtaining a number of modules corresponding to the black bars within said demodulating character based on a second black bar within said previous character, said second black bar being different from said first black bar; and
    (c3) demodulating said demodulating character based on the numbers of modules obtained in said steps (c1) and (c2).

4. The bar code demodulating method as claimed in claim 3, wherein said sub step (c3) demodulates said demodulating character only if the number of modules obtained in said sub-step (c1) is equal to the number of modules obtained in said sub-step (c2).

5. The bar code demodulating method as claimed in claim 4, which further comprises the step of:

(d) correcting a width of said first black bar and a width of said second black bar based on said ratio prior to said steps (c1) and (c2).

6. The bar code demodulating method as claimed in claim 1, wherein said step (c) demodulates said demodulating character only if said ratio falls within a first predetermined range when the demodulation is possible using only bars within said demodulating character, and demodulates said demodulating character only if said ratio falls within a second predetermined range when the demodulation is impossible using only the bars within said demodulating character and the demodulation is made using at least one reference bar within said previous character, said first and second predetermined ranges being mutually different.

7. The bar code demodulating method as claimed in claim 6, wherein said second predetermined range is smaller than said first predetermined range.

* * * * *

UNITED STATES PATENT AND TRADEMARK OFFICE
CERTIFICATE OF CORRECTION

PATENT NO. : 5,451,761
DATED : Sep. 19, 1995
INVENTOR(S) : KAWAI et al.

It is certified that error appears in the above-indentified patent and that said Letters Patent is hereby corrected as shown below:

Col. 2, line 19, after ""2"" insert --.--;
line 64, after "A number" insert --T1M--.

Col. 3, line 11, change "numbers and" to --numbers T1M and--.

Col. 6, line 19, change "B as data." to --6 as data.--.

Col. 7, line 62, change "in this" to --In this--.

Col. 11, line 17, change "BSRM" to --B5RM--;
line 18, change "BTRM" to --B7RM--.

Col. 12, line 1, change "aM2" to --ΔM2--; and delete "10".

Signed and Sealed this

Twelfth Day of December, 1995

Attest:

BRUCE LEHMAN

Attesting Officer

Commissioner of Patents and Trademarks